US008769237B2

(12) United States Patent
Nimura et al.

(10) Patent No.: US 8,769,237 B2
(45) Date of Patent: Jul. 1, 2014

(54) MAP UPDATING SYSTEM AND MAP UPDATING PROGRAM USING DYNAMIC CACHE MEMORY

(75) Inventors: Mitsuhiro Nimura, Okazaki (JP); Tatsumi Sakamoto, Chiryu (JP); Toyoji Hiyokawa, Okazaki (JP); Hiroyoshi Masuda, Nagoya (JP); Tomofumi Shibata, Okazaki (JP); Kazuyuki Hirakawa, Sapporo (JP); Atsushi Yamazaki, Sapporo (JP); Masahiro Hyakusawa, Sapporo (JP); Masahiro Takahashi, Sapporo (JP)

(73) Assignee: Aisin Aw Co., Ltd., Aichi-Ken (JP)

( * ) Notice: Subject to any disclaimer, the term of this patent is extended or adjusted under 35 U.S.C. 154(b) by 686 days.

(21) Appl. No.: 12/919,318

(22) PCT Filed: Feb. 26, 2009

(86) PCT No.: PCT/JP2009/054220
§ 371 (c)(1),
(2), (4) Date: Feb. 3, 2011

(87) PCT Pub. No.: WO2009/122851
PCT Pub. Date: Oct. 8, 2009

(65) Prior Publication Data
US 2011/0125962 A1 May 26, 2011

(30) Foreign Application Priority Data
Mar. 31, 2008 (JP) .................................. 2008-090820

(51) Int. Cl.
*G06F 13/00* (2006.01)
(52) U.S. Cl.
USPC .................... 711/173; 711/113; 711/E12.002

(58) Field of Classification Search
USPC ......................................................... 711/113
See application file for complete search history.

(56) References Cited

U.S. PATENT DOCUMENTS 6,038,559 A * 3/2000 Ashby et al. .................. 701/532
6,047,280 A 4/2000 Ashby et al.
(Continued)

FOREIGN PATENT DOCUMENTS

EP 1251335 A2 10/2002
JP 10-260881 9/1998
(Continued)

OTHER PUBLICATIONS

International Search Report of PCT/JP2009/054220, dated Jun. 5, 2009.

*Primary Examiner* — Sean D Rossiter
(74) *Attorney, Agent, or Firm* — Bacon & Thomas, PLLC

(57) ABSTRACT

A map updating system includes: an update processing unit for performing update processing by reading data required in the update processing from a cache area of a memory when the data are stored in the cache area and from a map database when the data are not stored in the cache area; a cache storage unit for storing the data read by the update processing unit in the cache area; a processing memory capacity determination unit for determining a processing memory capacity, which is a capacity of the memory required as an update processing area, on the basis of the content of map data to be subjected to the update processing; and a cache capacity determination unit for determining a cache capacity, which is a capacity of the memory allocated to the cache area, on the basis of the processing memory capacity.

16 Claims, 8 Drawing Sheets

(56) References Cited

U.S. PATENT DOCUMENTS

| | | | |
|---|---|---|---|
| 6,173,277 B1 | 1/2001 | Ashby et al. | |
| 6,915,206 B2 * | 7/2005 | Sasajima | 701/532 |
| 2002/0169778 A1 | 11/2002 | Natesan et al. | |
| 2003/0069916 A1 * | 4/2003 | Hirschsohn | 709/104 |
| 2004/0107220 A1 | 6/2004 | Natesan et al. | |
| 2004/0193370 A1 | 9/2004 | Umezu et al. | |
| 2005/0114018 A1 * | 5/2005 | Umezu et al. | 701/208 |
| 2008/0082255 A1 * | 4/2008 | Takahata et al. | 701/201 |
| 2010/0076680 A1 * | 3/2010 | Horiguchi et al. | 701/209 |

FOREIGN PATENT DOCUMENTS

| | | |
|---|---|---|
| JP | 11-327979 | 11/1999 |
| JP | 2002-144646 | 5/2002 |
| JP | 2003-030043 | 1/2003 |
| JP | 2006-107054 | 4/2006 |
| JP | 2006-186777 | 7/2006 |
| JP | 2007-328739 | 12/2007 |
| RU | 2207632 C2 | 6/2003 |

\* cited by examiner

F I G . 2
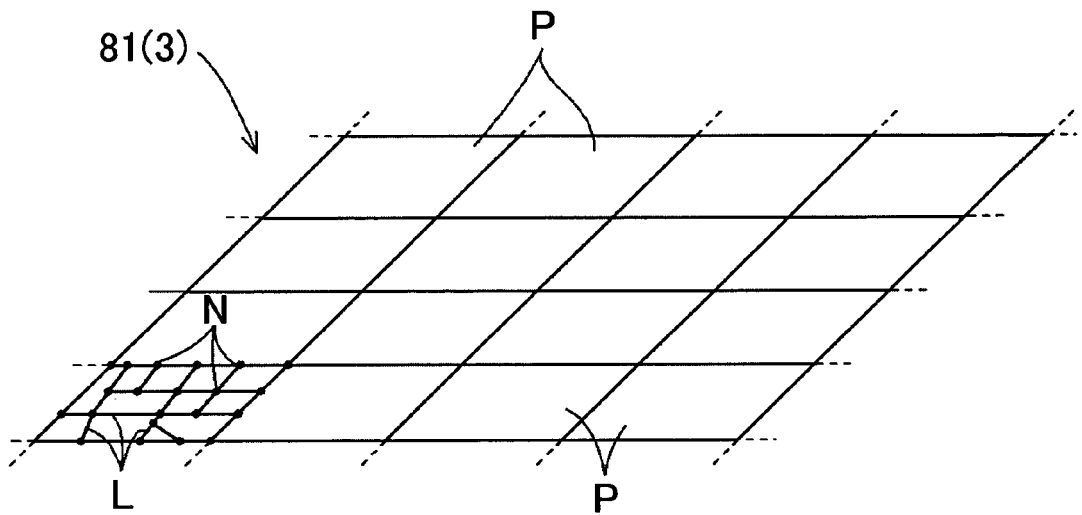
F I G . 3
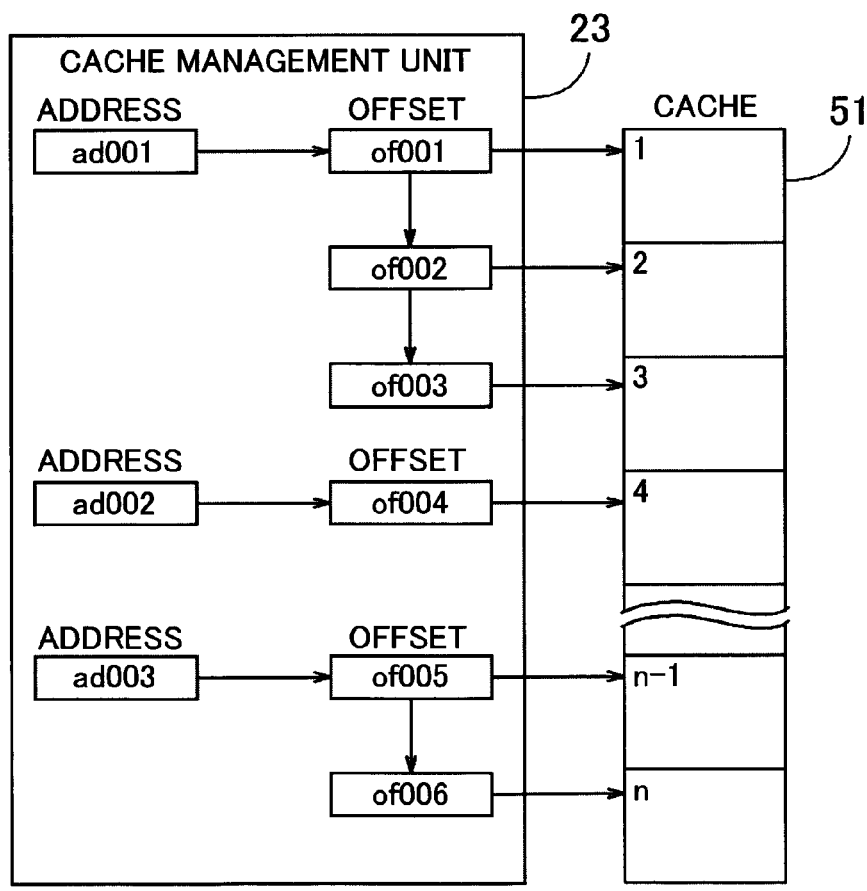

MAP UPDATING SYSTEM AND MAP UPDATING PROGRAM USING DYNAMIC CACHE MEMORY

TECHNICAL FIELD

The present invention relates to a map updating system which includes a map database storing map data and in which update processing is performed on the map database upon reception of update data, and a map updating program for performing this update processing on the map database.

BACKGROUND ART

It is typically desirable for a map to reflect the current conditions of constantly changing roads, facilities and so on accurately. Therefore, in a known system employed in a map database storing map data in the form of electronic data for use in a navigation device or the like, for example, update data are provided appropriately via a communication network, a data recording medium, or the like, and the map database is updated using the update data. An updating system such as the following is described in Japanese Patent Application Publication 2007-328739 (pages 17 to 21, FIG. 1) as an example of this type of map database updating system.

This updating system is constituted by a terminal device such as a navigation device which is operated in accordance with a predetermined operating program, and a server device that provides a difference data file as update data. The terminal device includes a local storage database storing map data in an update data format for performing a difference update in accordance with the difference data file, and a reference database storing map data in a reference data format for reference by the operating program. Upon reception of the difference data file, the terminal device performs a difference update on the map data stored in the local storage database in the update data format, and then performs processing to convert the updated map data into map data in the reference data format and store the converted data in the reference database. Thus, the map data in the reference database that is referenced by the operating program are updated.

In the map database updating system described above, a large amount of file access is performed on the map databases including the local storage database to read required data when a difference update is performed on the map data in the local storage database in accordance with the difference data file, when the updated map data in the local storage database are converted into map data in the reference data format, and so on. Therefore, the time required for this file access occupies a large proportion of the time required for the map database update processing. One effective solution for reducing the file access time is to store read data in a cache area of a memory and then read the same data from the cache area as required.

However, in cases where a large-capacity memory cannot be installed in the terminal device due to cost or size limitations and so on, it may be difficult to secure a cache area having a sufficiently large capacity. In a terminal device such as a navigation device installed in a vehicle, size limitations and so on are particularly severe in comparison with a stationary terminal device such as a personal computer, and it is therefore difficult to install a large-capacity memory. Accordingly, a large-capacity cache region cannot easily be secured in the memory. As a result, a large amount of data cannot be stored in the cache area and the proportion of the cache used for file access cannot be increased, making it impossible to achieve a large reduction in the file access time.

SUMMARY OF THE INVENTION

The present invention has been designed in consideration of the problem described above, and it is an object thereof to provide a map updating system and a map updating program with which the time required for map database update processing can be shortened by securing a cache area through efficient use of a memory having a limited capacity.

A featured constitution of the present invention for achieving the object described above is a map updating system which includes a map database storing map data and performs update processing on the map database upon reception of update data. The map updating system includes: a memory having an update processing area used for the update processing and a cache area used as a cache; an update processing unit for performing the update processing by reading data required in the update processing from the cache area when the data are stored in the cache area and from the map database when the data are not stored in the cache area; a cache storage unit for storing the data read by the update processing unit in the cache area; a processing memory capacity determination unit for determining a processing memory capacity, which is a capacity of the memory required as the update processing area, on the basis of content of the map data to be subjected to the update processing; and a cache capacity determination unit for determining a cache capacity, which is a capacity of the memory allocated to the cache area, on the basis of the processing memory capacity.

According to this featured constitution, the cache area provided in the memory is used to read the data required in the update processing, and therefore, when the same data are read a plurality of times, the speed of the reading processing can be increased in comparison with a case in which all of the data are read directly from the map database. Also according to this featured constitution, the cache capacity, which is the capacity of the memory allocated to the cache area used during the reading processing, is determined on the basis of the processing memory capacity, which is determined on the basis of the content of the map data to be subjected to update processing. Hence, an appropriate processing memory capacity can be set variably in accordance with the content of the map data to be subjected to update processing, and the cache capacity can be set variably in accordance with the set processing memory capacity, and as a result, in cases where the processing memory capacity does not have to be large, the cache capacity can be increased correspondingly. Therefore, in comparison with a case in which the cache capacity is fixed, a comparatively large cache area can be secured through efficient use of the limited memory capacity, and therefore the time required to update the map can be shortened.

Here, the cache capacity determination unit preferably sets a surplus memory capacity determined on the basis of a capacity obtained by subtracting the processing memory capacity from a total capacity of the memory as the cache capacity.

According to this constitution, the required processing memory capacity is secured as the update processing area, and therefore the cache capacity can be set appropriately at a maximum limit in accordance with variation in the processing memory capacity, which is determined in accordance with the content of the map data to be subjected to update processing.

Further, the processing memory capacity determination unit preferably determines the processing memory capacity on the basis of one or both of a number of roads and a number of intersections included in the map data to be subjected to the update processing.

According to this constitution, the processing memory capacity is determined in accordance with one or both of the number of roads and the number of intersections, i.e. content of the map data that greatly affects the memory capacity required as the update processing area, and therefore the processing memory capacity required during update processing of the map data can be determined appropriately.

Further, the map data preferably include road network data constituted by a plurality of nodes corresponding to intersections and a plurality of links corresponding to roads that connect the nodes, and the processing memory capacity determination unit preferably determines the processing memory capacity on the basis of one or both of the number of links and the number of nodes included in the map data to be subjected to the update processing.

According to this constitution, when the map data include road network data constituted by nodes and links, the processing memory capacity is determined in accordance with one or both of the number of links and the number of nodes, i.e. the content of the map data that greatly affects the memory capacity required as the update processing area, and therefore the processing memory capacity required during update processing of the map data can be determined appropriately.

Further, the processing memory capacity determination unit preferably determines the processing memory capacity on the basis of a data amount of the map data to be subjected to the update processing.

According to this constitution, the processing memory capacity is determined in accordance with the data amount of the map data, i.e. the content of the map data that greatly affects the memory capacity required as the update processing area, and therefore the processing memory capacity required during update processing of the map data can be determined appropriately.

Further, the map database preferably stores the map data in each of a plurality of sections obtained by dividing a subject geographical area into the plurality of sections, and the update processing unit preferably sets the map data in each of the sections as the update processing subject.

According to this constitution, the map data in each section can be set successively as the update processing subject, and therefore the update processing can be performed appropriately.

Further, when the update processing subject shifts to the map data in a subsequent section, the processing memory capacity determination unit preferably determines the processing memory capacity anew on the basis of the content of the map data in the subsequent section.

According to this constitution, when updating of the map data in one update subject section is complete and update processing is performed on the map data in the next update subject section, the processing memory capacity can be determined appropriately in accordance with the content of the next map data. Hence, an appropriate processing memory capacity can be set variably in accordance with the content of the map data to be subjected to update processing at each point in time, and the cache capacity can be set appropriately in accordance with the set processing memory capacity.

The map updating system according to the present invention preferably further includes: a navigation processing unit for performing predetermined navigation processing; and a navigation memory capacity determination unit for determining a navigation memory capacity, which is a capacity required as an area of the memory used in the navigation processing, on the basis of processing content executed as the navigation processing, wherein the cache capacity determination unit determines the cache capacity on the basis of the processing memory capacity and the navigation memory capacity.

According to this constitution, the cache capacity, which is the capacity of the memory allocated to the cache area used during the reading processing, is determined on the basis of both the processing memory capacity, which is determined on the basis of the content of the map data to be subjected to update processing, and the navigation memory capacity, which is determined on the basis of the content of the processing executed as the navigation processing. Hence, an appropriate processing memory capacity can be set variably in accordance with the content of the map data to be subjected to update processing, an appropriate navigation memory capacity can be set variably in accordance with the content of the processing executed as the navigation processing, and the cache capacity can be set variably in accordance with the set processing memory capacity and navigation memory capacity. As a result, in cases where the processing memory capacity and the navigation memory capacity do not have to be large, the cache capacity can be increased correspondingly. Therefore, in comparison with a case in which the cache capacity is fixed or a case in which the cache capacity is set variably on the basis of the processing memory capacity alone, a comparatively large cache area can be secured through efficient use of the limited memory capacity, and therefore the time required to update the map can be shortened even further.

Here, the cache capacity determination unit preferably sets a surplus memory capacity determined on the basis of a capacity obtained by subtracting the processing memory capacity and the navigation memory capacity from the total capacity of the memory as the cache capacity.

According to this constitution, the required processing memory capacity is secured as the update processing area and the required navigation memory capacity is secured as the navigation processing area, and therefore the cache capacity can be set appropriately at a maximum limit in accordance with variation in the processing memory capacity, which is determined in accordance with the content of the map data to be subjected to update processing, and variation in the navigation memory capacity, which is determined in accordance with the content of the processing executed as the navigation processing.

Further, the navigation memory capacity determination unit preferably determines the navigation memory capacity on the basis of one or both of a type and a number of application processes that are underway as the navigation processing.

According to this constitution, the navigation memory capacity is determined in accordance with one or both of the type and the number of the application processes that are underway, both of which greatly affect the memory capacity required as the navigation processing area, and therefore the required navigation memory capacity can be determined appropriately in accordance with the operational state of the navigation processing unit.

Further, the navigation memory capacity determination unit preferably determines the navigation memory capacity anew when execution of the respective application processes is started or completed.

According to this constitution, every time execution of one of the application processes serving as the navigation processing is started or completed, the navigation memory capacity can be determined appropriately in accordance with the execution state of the respective application processes at that point in time. Hence, an appropriate navigation memory capacity can be set variably in accordance with the execution state of the application processes at each point in time, and the cache capacity can be set appropriately in accordance with the set navigation memory capacity.

Further, the cache storage unit preferably deletes the oldest stored data in order of storage from the cache area when new data are stored in the cache area.

According to this constitution, data that are comparatively unlikely to be read again can be deleted such that new data can be stored in the cache area, and therefore data can be stored appropriately in the limited cache area.

The map updating system according to the present invention preferably further includes a cache management unit for managing the data stored in the cache area in association with an address of a file that is stored in the map database and includes the data.

According to this constitution, when data reading is performed by specifying the address of a file including the data required in the update processing, the data can be read easily from the cache area. Hence, a further increase in the speed of the data reading processing can be achieved.

Further, the map database preferably includes an update database storing update map data that are updated by the update data and a reference database storing reference map data that are referenced by an application process that uses the map data, and the update processing unit, after updating the update map data with the update data, preferably generates updated reference map data by converting the updated update map data into the updated reference map data, and stores the updated reference map data in the reference database.

According to this constitution, the update map data stored in the update database are updated by the update data, and therefore the processing for updating the map data with the update data can be performed easily and quickly. Further, by converting the updated update map data into reference map data for reference during the application processing, the application processing can be performed with reference to map data in a suitable format for reference. As a result, deterioration of the operation performance of the application processing can be suppressed while ensuring that updating of the map data with the update data can be performed easily and quickly.

Another featured constitution of the present invention is a map updating system which includes a map database storing map data and performs update processing on the map database upon reception of update data. The map updating system includes: a navigation processing unit for performing predetermined navigation processing; a memory having a navigation processing area used in the navigation processing and a cache area used as a cache; an update processing unit for performing the update processing by reading data required in the update processing from the cache area when the data are stored in the cache area and from the map database when the data are not stored in the cache area; a cache storage unit for storing the data read by the update processing unit in the cache area; a navigation memory capacity determination unit for determining a navigation memory capacity, which is a capacity of the memory required as the navigation processing area, on the basis of processing content executed as the navigation processing; and a cache capacity determination unit for determining a cache capacity, which is a capacity of the memory allocated to the cache area, on the basis of the navigation memory capacity.

According to this featured constitution, the cache area provided in the memory is used to read the data required in the update processing, and therefore, when the same data are read a plurality of times, the speed of the reading processing can be increased in comparison with a case in which all of the data are read directly from the map database. Also according to this featured constitution, the cache capacity, which is the capacity of the memory allocated to the cache area used during the reading processing, is determined on the basis of the navigation memory capacity, which is determined on the basis of the content of the processing executed as the navigation processing. Hence, an appropriate navigation memory capacity can be set variably in accordance with the content of the processing executed as the navigation processing, and the cache capacity can be set variably in accordance with the set navigation memory capacity. As a result, in cases where the navigation memory capacity does not have to be large, the cache capacity can be increased correspondingly. Therefore, in comparison with a case in which the cache capacity is fixed, a comparatively large cache area can be secured through efficient use of the limited memory capacity, and therefore the time required to update the map can be shortened.

The technical constitution of the map updating system according to the present invention, having the respective constitutions described above, may be applied to a map updating method and a map updating program, and therefore, the present invention also claims rights as this type of method and program.

In this case, a featured constitution of the present invention is a map updating program for performing update processing on a map database storing map data upon reception of update data, wherein the map updating program causes a computer to realize: an update processing function for performing the update processing by reading data required in the update processing from a cache area of a memory when the data are stored in the cache area and from the map database when the data are not stored in the cache area; a cache storage function for storing the data read during execution of the update processing function in the cache area; a processing memory capacity determination function for determining a processing memory capacity, which is a capacity of the memory required as an update processing area of the memory that is used in the update processing, on the basis of content of the map data to be subjected to the update processing; and a cache capacity determination function for determining a cache capacity, which is a capacity of the memory allocated to the cache area, on the basis of the processing memory capacity.

Another featured constitution of the present invention is a map updating program for performing update processing on a map database storing map data upon reception of update data, wherein the map updating program causes a computer to realize: a navigation processing function for performing predetermined navigation processing; an update processing function for performing the update processing by reading data required in the update processing from a cache area of a memory when the data are stored in the cache area and from the map database when the data are not stored in the cache area; a cache storage function for storing the data read during execution of the update processing function in the cache area; a navigation memory capacity determination function for determining a navigation memory capacity, which is a capacity of the memory required as a navigation processing area of the memory that is used in the navigation processing, on the basis of processing content executed as the navigation processing; and a cache capacity determination function for determining a cache capacity, which is a capacity of the memory allocated to the cache area, on the basis of the navigation memory capacity.

Needless to say, these map updating programs are also capable of obtaining the actions and effects of the map updating system described above, and moreover, the several techniques cited as preferred constitutional examples thereof may be incorporated therein.

BRIEF DESCRIPTION OF THE DRAWINGS

FIG. 2 is a schematic diagram showing the content of update map data;

FIG. 3 is a pattern diagram showing the constitution of a cache management unit;

DETAILED DESCRIPTION OF THE EMBODIMENTS

Figure 1:
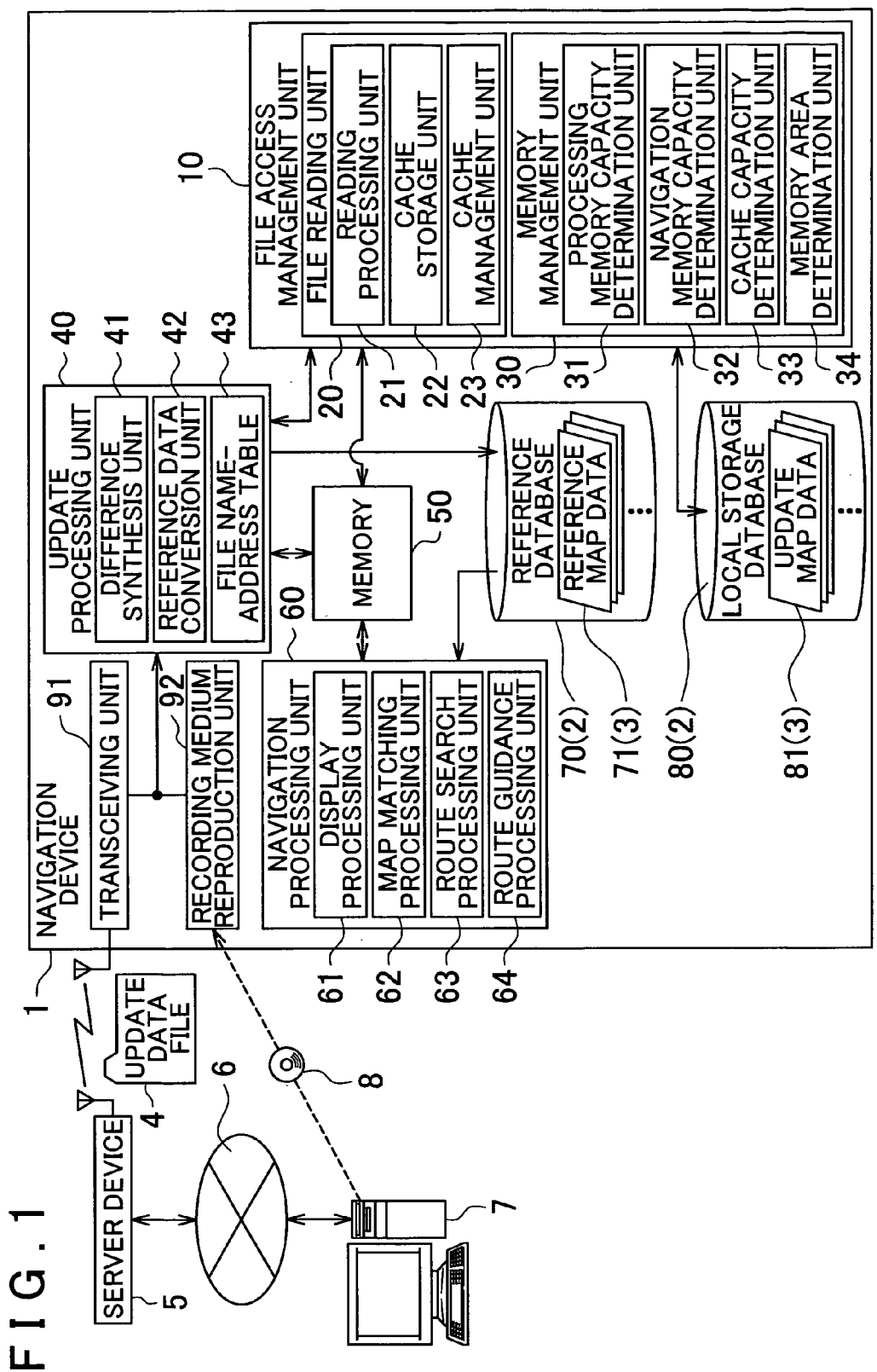
FIG. 1 is a block diagram showing in pattern form the functional constitution of a navigation device according to an embodiment of the present invention.

An embodiment of the present invention will now be described on the basis of the drawings. In this embodiment, a case in which a map updating system according to the present invention is applied to a navigation device 1 serving as a vehicle-installed terminal device installed in a vehicle will be described. FIG. 1 is a block diagram showing in pattern form the functional constitution of the navigation device 1 according to this embodiment. The navigation device 1 includes a reference database 70 and a local storage database 80 serving as map databases 2 that respectively store reference map data 71 and update map data 81 serving as map data 3. The navigation device 1 performs update processing on the reference map data 71 and update map data 81 upon reception of an update data file 4 from a server device 5. The navigation device 1 is constituted to be capable of setting the capacity of a cache area 51 (see FIGS. 4 and 5) variably at this time in accordance with the capacity of a memory 50 required in map update processing and navigation processing. In so doing, the navigation device 1 can secure the cache area 51 through efficient use of the limited capacity of the memory 50, and as a result, the time required for performing update processing on the reference database 70 and local storage database 80 can be shortened.

A file access management unit 10, an update processing unit 40, and a navigation processing unit 60, which constitute function units of the navigation device 1 shown in FIG. 1, are formed by packaging function units for performing various processes on input data in hardware, software (programs), or both using a calculation processing device such as a CPU, which is shared among the function units or provided in each function unit, as a core member. Further, constitutions for providing the functions of a transceiving unit 91 and a recording medium reproduction unit 92, which also serve as function units of the navigation device 1, are realized by hardware or a combination of hardware and software (programs). These function units are connected as shown by arrows in FIG. 1 to be capable of exchanging various types of information and data. The memory 50 is a storage device capable of reading and writing at a comparatively high speed using the calculation processing devices of the respective function units, and is constituted by a volatile memory such as DRAM (Dynamic RAM) or SRAM (Static RAM), for example. Further, the reference database 70 and local storage database 80 are constituted by hardware devices having a recording medium for recording data rewritably and a driving unit thereof, for example a hard disk drive or a non-volatile semiconductor memory such as an EEPROM. The constitutions of the respective parts of the navigation device 1 will be described below in succession.

(Navigation Processing Unit)

The navigation processing unit 60 is a processing unit for executing navigation processing as a function of the navigation device 1. In this embodiment, the navigation processing unit 60 corresponds to a navigation processing unit of the present invention. Although not shown in the drawings, a vehicle position detection unit, an operation unit, a display unit, a voice output unit and so on are connected to the navigation processing unit 60 to be capable of exchanging various types of information and data therewith. Here, the vehicle position detection unit is a function unit for detecting the current position of the navigation device 1, and includes a GPS receiver, a bearing sensor, a distance sensor, and so on, for example. The operation unit is constituted by a touch panel, an operating switch, a remote control unit, or the like, for example, and is operated by a user to input and select information. The display unit is constituted by a liquid crystal display device or the like, for example, and displays various types of information relating to the navigation processing, such as maps and guidance routes. The voice output unit is constituted by a speaker or the like, for example, and outputs various types of information relating to the navigation processing, such as route guidance, by voice.

In this embodiment, the navigation processing unit 60 includes a display processing unit 61, a map matching processing unit 62, a route search processing unit 63, and a route guidance processing unit 64. These units correspond to application processing units for executing various application processes serving as the navigation processing. The respective application processing units 61 to 64 are typically constituted by a calculation processing device and a program for causing the calculation processing device to perform calculation processing. Here, the display processing unit 61 performs processing for displaying various types of information relating to the navigation processing, such as map display, display of the vehicle position on the map, and guidance route display, using the display unit. The map matching processing unit 62 performs map matching processing to match the vehicle position detected by the vehicle position detection unit with a road on the map. The route search processing unit 63 performs processing to search for a guidance route or the like from a departure point such as the vehicle position to a destination input through the operation unit, for example. The route guidance processing unit 64 performs processing to guide the user along an appropriate route in accordance with the route to the destination searched for by the route search processing unit 63 using guidance display by the display unit, voice guidance by the voice output unit, and so on. Note that the specific content of the various navigation processes executed by the processing units 61 to 64 is well known, and therefore detailed description has been omitted. In this embodiment, the display processing, map matching processing, route search processing, and route guidance processing executed respectively by the application processing units 61 to 64 correspond to application processing according to the present invention. During execution of the application processing, the application processing units 61 to 64 refer to the reference map data 71 in the reference database 70.

Figure 4:
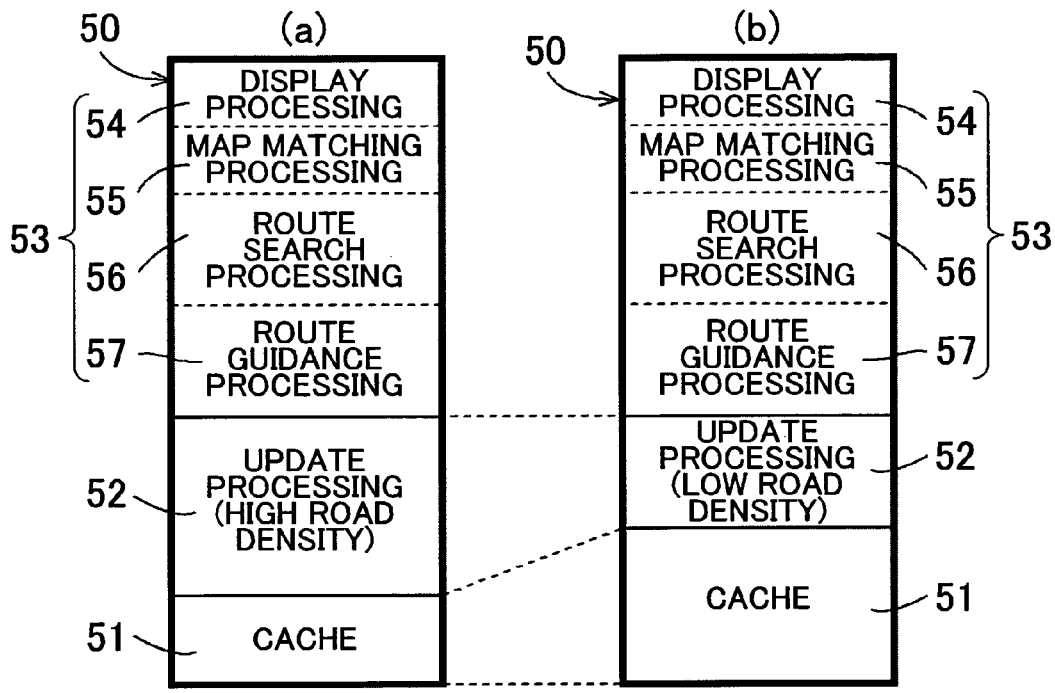
FIG. 4 is a view showing a specific example of area setting in the interior of a memory.
Figure 5:
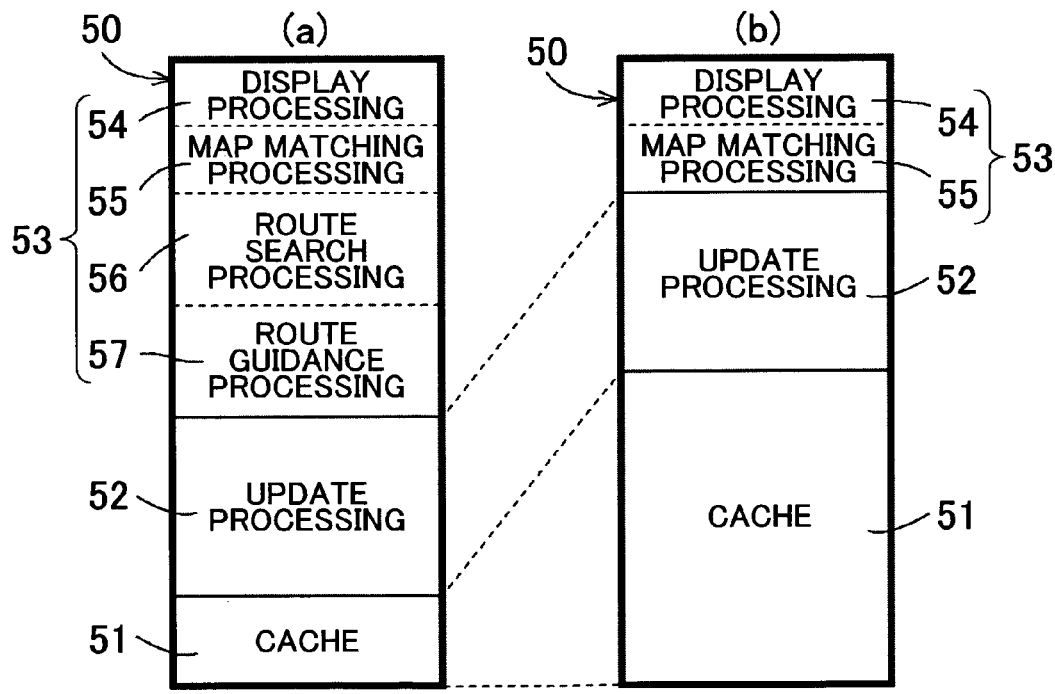
FIG. 5 is a view showing a specific example of area setting in the interior of the memory.

Further, the application processing units 61 to 64 use the memory 50 during execution of the application processing. For this purpose, the memory 50 is provided with a navigation processing area 53, which is an area of the memory 50 used for the navigation processing performed by the navigation processing unit 60, as shown in FIGS. 4 and 5. Here, a display processing area 54, a map matching processing area 55, a route search processing area 56, and a route guidance processing area 57 may be set as the navigation processing area 53 in accordance with the application processing executed by the respective application processing units 61 to 64 of the navigation processing unit 60. In this embodiment, only the area that corresponds to the processing being executed is set as the navigation processing area 53 by a memory management unit 30, to be described below, in accordance with the execution state of the application processing performed by the application processing units 61 to 64. Accordingly, the memory capacity of the navigation processing area 53 is set to be variable.

(Reference Database)

The reference database 70 is a database storing the reference map data 71, which are referred to by the application processing units 61 to 64 during execution of the application processing described above using map data. Here, the reference map data 71 are map data in a reference data format suitable for reference by the application processing units 61 to 64. More specifically, the reference map data 71 are constituted by common map data referenced in common by the application processing units 61 to 64, display/map matching map data referenced by the display processing unit 61 and the map matching processing unit 62, route search map data referenced by the route search processing unit 63, and route guidance map data referenced by the route guidance processing unit 64, for example. The map data constituting the reference map data 71 take a data format suitable for reference by the application processing units 61 to 64 that refer to the respective map data. The data format corresponds to a data format in which various data are arranged in an identical sequence to the sequence in which the various data are processed by the application processing units 61 to 64, for example.

The map data constituting the reference map data 71 are provided in each of a plurality of sections P formed by dividing a subject geographical area into the plurality of sections P, similarly to the update map data 81 to be described below (see FIG. 2). Further, the map data respectively include road network data constituted by a plurality of nodes N corresponding respectively to a plurality of intersections existing within each section P, and a plurality of links L corresponding to roads connecting the nodes N, similarly to the update map data 81 to be described below. In addition to the road network data, the reference map data 71 include rendering information, which includes various types of information required in the display processing performed by the display processing unit 61, various types of guidance information required in the route guidance processing performed by the route guidance processing unit 64, and so on. Here, the rendering information includes information such as background information required to display road shapes, buildings, rivers and so on, character information required to display city, town and village names, road names, and so on. The guidance information includes intersection information, which is constituted by detailed information relating to intersections, and so on.

(Local Storage Database)

The local storage database 80 is a database storing the update map data 81 used during updating in accordance with the update data file 4. In this embodiment, the local storage database 80 corresponds to an update database according to the present invention. Here, the update map data 81 are map data in an update data format suitable for updating using the update data file 4. The update data format corresponds to a data format in which the various types of data constituting the map data are arranged according to data type, for example. Examples of these data types include road data, which are various types of data relating to the links corresponding to roads, intersection data, which are various types of data relating to the nodes corresponding to intersections, shape data, which are various types of data relating to the respective shapes of the links, and connection data, which are various types of data relating to the links connected to the nodes.

Further, as shown in FIG. 2, the update map data 81 are provided in each of a plurality of sections P formed by dividing a subject geographical area into the plurality of sections P. Here, the sections P are formed as rectangles of an identical size. In a case where the whole of Japan is the target geographical area, for example, the local storage database 80 stores the update map data 81 in each of a plurality of sections P formed by dividing map data in a range including the whole of Japan into m×n (m and n being natural numbers). Further, the update map data 81 respectively include road network data constituted by a plurality of nodes N corresponding respectively to a plurality of intersections existing within each section P, and a plurality of links L corresponding to roads connecting the nodes N.

Here, the nodes N correspond to intersections between existing roads, and the links L correspond to roads connecting the intersections. Each node N includes information relating to a position (coordinates) on a map expressed by longitude and latitude. Further, the node N includes information relating to traffic regulations, traffic lights, and so on as node property information. Each link L includes information such as road length, road type, road width, lane number, and shape interpolation points for expressing link shapes as link property information. Here, the road type is road classification information used when compartmentalizing roads into a plurality of types such as expressways, national roads, prefectural roads, local roads, narrow city streets, and introductory roads. Note that in FIG. 2, the road network data are shown in only one of the sections P and the other sections P have been omitted. Following conversion to the reference map data 71, the update map data 81 also include rendering information, which is various types of information required for the display processing performed by the display processing unit 61, various types of guidance information required for the route guidance processing performed by the route guidance processing unit 64, and so on. As described above, the rendering information includes information such as background information required to display road shapes, buildings, rivers and so on, character information required to display city, town and village names, road names, and so on. Further, the guidance information includes intersection information, which is constituted by detailed information relating to intersections, and so on.

(Transceiving Unit/Recording Medium Reproduction Unit)

The navigation device 1 according to this embodiment includes the transceiving unit 91 and the recording medium reproduction unit 92 as units for receiving the update data file 4. The transceiving unit 91 performs data transmission and reception with the server device 5, such as a wireless base station, through wireless communication, and is constituted to be capable of receiving the update data file 4 through wireless communication. A well known communication network such as a portable telephone network or a wireless LAN (Local Area Network), for example, may be used as a wireless communication method. Further, the recording medium reproduction unit 92 is constituted to be capable of reproducing a recording medium 8 such as an optical disk or a magnetic disk, and reading the update data file 4 recorded on the recording medium 8. As shown in FIG. 1, for example, the recording medium 8 is generated when the user downloads the update data file 4 to a personally owned terminal device such as a personal computer from the server device 5 via a communication network 6 such as the Internet, and records the downloaded update data file 4 onto the recording medium 8.

Here, the obtained update data file 4 is a file gathering together various data representing content for updating the update map data 81 stored in the local storage database 80. The update data file 4 is a difference data file representing modification content, such as a road or a facility that has actually been modified, as a difference using the content of the update map data 81 stored in the local storage database 80 as a reference. The update data file 4 includes update data corresponding to the update map data 81 in each of one or more sections P serving as an update subject. Furthermore, in this embodiment, the update data file 4 is divided into update modes relating to the update map data 81 such as addition, modification, and deletion, and has a data format in which data representing the update content of each update mode are arranged according to data type, similarly to the update map data 81. As described above, examples of the data type include road data, intersection data, shape data, and connection data.

(Update Processing Unit)

The update processing unit 40 is a processing unit for executing update processing on the local storage database 80 and the reference database 70 using the update data file 4. In this embodiment, the update processing unit 40 includes a difference synthesis unit 41, a reference data conversion unit 42, and a file name-address table 43. First, the update processing unit 40 uses the difference synthesis unit 41 to update the update map data 81 stored in the local storage database 80 in accordance with the update data file 4. Next, the update processing unit 40 uses the reference data conversion unit 42 to convert the updated update map data 81 to generate updated reference map data 71 and store the updated reference map data 71 in the reference database 70. As a result, the local storage database 80 and the reference database 70 are updated. In this embodiment, the update processing unit 40 corresponds to an update processing unit according to the present invention.

The difference synthesis unit 41 is a processing unit for performing processing to update the update map data 81 stored in the local storage database 80 using the update data file 4 obtained by the transceiving unit 91 or the recording medium reproduction unit 92. As described above, the update map data 81 are provided in each of the sections P, and the update data included in the update data file 4 are also provided in each of the sections P. The difference synthesis unit 41 selects one section P from the one or more sections P to be subjected to updating by the update data included in the update data file 4, and sets the selected section P as an update subject section. The update map data 81 in the update subject section are then updated by the update data relating to this section P. When the update data file 4 includes update data relating to a plurality of the sections P, update processing is performed in each section P by modifying the update subject section successively every time updating of the update map data 81 in one section P is completed.

Further, as described above, the update data file 4 is a difference data file that uses the content of the update map data 81 stored in the local storage database 80 as a reference. Hence, the difference synthesis unit 41 performs a difference update on the update map data 81 through difference synthesis, in which the update difference data of each section P included in the update data file 4 is synthesized with the update map data 81. More specifically, the difference synthesis unit 41 performs update processing such as adding the content of the difference data to the update map data 81, modifying the content of the update map data 81 to the content of the update data, or deleting data indicated by the content of the difference data from the update map data 81 in accordance with update modes such as addition, modification and deletion. The updated update map data 81 are then returned to and stored in the local storage database 80.

The reference data conversion unit 42 is a processing unit for performing processing to convert the update map data 81 updated by the difference synthesis unit 41 into the reference map data 71. As described above, the difference synthesis unit 41 updates the update map data 81 in each section P. Hence, the reference data conversion unit 42 successively sets the update map data 81 for which updating by the difference synthesis unit 41 is complete as a subject, and successively converts the updated update map data 81 in each section P to generate the reference map data 71. Thus, updating of the update map data 81 and generation of the updated reference map data 71 based on the updated update map data 81 can be performed consistently in each of the sections P set as the update subject section.

Here, the reference data conversion unit 42 performs processing to convert the update map data 81 in the update data format into the reference map data 71 in the reference data format, which is suitable for reference by the respective application processing units 61 to 64. As described above, the reference map data 71 are constituted by a plurality of map data such as common map data, display/map matching map data, route search map data, and route guidance map data, which are suitable for reference by the respective application processing units 61 to 64. Hence, the reference data conversion unit 42 performs processing to generate the plurality of map data by converting a single piece of update map data 81. The updated reference map data 71 generated by the reference data conversion unit 42 are stored in the reference database 70. At this time, the pre-update reference map data 71 corresponding to the updated reference map data 71 are deleted from the reference database 70.

Thus, the update map data 81 stored in the local storage database 80 and the reference map data 71 stored in the reference database 70 are updated on the basis of the update data file 4. The update processing unit 40 reads the required data from the local storage database 80 during this update processing, and to increase the speed of the data reading processing at this time, the cache area 51 provided in the memory 50 is used as a cache. More specifically, the update processing unit 40 performs update processing after reading the data required for the update processing from the cache area 51 of the memory 50 when the data are provided in the cache area 51 or reading the data from the local storage database 80 when the data are not provided in the cache area 51. The processing to read the data required by the update processing unit 40 is performed by a file reading unit 20 to be described below. In this embodiment, the update processing unit 40 causes the file reading unit 20 to read the data in a file required for the update processing by informing the file reading unit 20 of the address of the file.

Incidentally, the difference synthesis unit 41 and the reference data conversion unit 42 of the update processing unit 40 handle files required in the processing (update processing) performed respectively thereby using file names. Therefore, the update processing unit 40 includes the file name-address table 43 for specifying the address of a file required by the update processing from the file name. Here, the file address is information (address information) indicating a location of the local storage database 80 in which the file is stored. In other words, the file name-address table 43 is a table providing associations between file names and addresses in relation to all of the files stored in the local storage database 80.

The difference synthesis unit 41 and the reference data conversion unit 42 of the update processing unit 40 use the memory 50 during execution of the processing performed respectively thereby. Hence, as shown in FIGS. 4 and 5, an update processing area 52, which is an area of the memory 50 used in the update processing performed by the update processing unit 40, is set in the memory 50. In this embodiment, the memory capacity of the update processing area 52 is set to be variable in accordance with the content of the update map data 81 to be subjected to update processing by the update processing unit 40 using the memory management unit 30, to be described below.

(File Access Management Unit)

The file access management unit 10 is a processing unit for performing management in relation to file access from the update processing unit 40 to the local storage database 80 and the memory 50, such as reading processing when the update processing unit 40 reads the data required in the update processing and management of the memory 50 when the memory 50 functions as a cache during the reading processing. In this embodiment, the file access management unit 10 includes the file reading unit 20 and the memory management unit 30. The constitution of the file access management unit 10 is a featured part of the present invention. Therefore, the constitutions of the file reading unit 20 and memory management unit 30 constituting the file access management unit 10 will be described in detail below.

(File Reading Unit)

The file reading unit 20 is a processing unit for performing processing relating to the reading performed when the update processing unit 40 reads the data required in the update processing. In this embodiment, the file reading unit 20 includes a reading processing unit 21, a cache storage unit 22, and a cache management unit 23, which serve as function units responsible for the processing relating to this reading. As will be described below, the cache that is used during data reading is set as the cache area 51 of the memory 50. In addition to the cache area 51, the memory 50 includes an update processing area 52 used by the update processing unit 40, and a navigation processing area 53 used by the navigation processing unit 60.

The reading processing unit 21 is a processing unit for performing reading processing in which data constituting a file required for the update processing specified by the update processing unit 40 are read from the cache area 51 provided in the memory 50 or the local storage database 80. The reading processing unit 21 performs processing to read the data constituting the file required for the update processing from the cache area 51 of the memory 50 when the data are provided in the cache area 51 and from the local storage database 80 when the data are not provided in the cache area 51. More specifically, first, the reading processing unit 21 searches the cache area 51 to determine whether or not data constituting a file required for the update processing exist, and when such data exist, the reading processing unit 21 reads the data from the cache area 51. When data constituting a file required for the updating processing do not exist in the cache area 51, on the other hand, the data are read from the local storage database 80.

At this time, a file required for the update processing is specified by the update processing unit 40 by the address of the file. Accordingly, the reading processing unit 21 performs processing on the basis of the file address to search the cache area 51 or the local storage database 80 for the data constituting the file and read the data. Incidentally, the address of the file provided to the reading processing unit 21 from the update processing unit 40 indicates the location of the local storage database 80 in which the file is stored. Hence, the file reading unit 20 can read the specified file from the local storage database 80 directly on the basis of the address. However, it is difficult to search the cache area 51 to determine whether or not the data constituting the specified file are stored therein or read the data from the cache area 51 directly on the basis of the address. Hence, when searching for and reading data from the cache area 51, the reading processing unit 21 uses management information in the cache management unit 23. The cache management unit 23 includes management information for managing the data stored in the cache area 51 in association with the address of the file including the data in the local storage database 80. In this embodiment, the cache management unit 23 corresponds to a cache management unit according to the present invention.

FIG. 3 is a pattern diagram showing the constitution of the cache management unit 23. As shown in the drawing, the cache area 51 of the memory 50 is divided into a plurality of cells, each cell serving as a data storage area having a predetermined unit data capacity (for example, 64 [kbyte], 128 [kbyte], or the like). In the example shown in the drawing, the cache area 51 is divided into n cells. As will be described below, the memory capacity of the cache area 51 is variable, and therefore the number of cells having the unit data capacity may be set variably in accordance with the memory capacity of the cache area 51. The cache management unit 23 includes information indicating the address of the data stored in each cell of the cache area 51 in association with each cell as management information. More specifically, as shown in the drawing, the cache management unit 23 includes management information for managing the data in each cell of the cache area 51 in association with an address ad001 to ad003 of the file including the data and an offset of001 to of006 from each address.

Here, the address ad001 to ad003 is information indicating the address of the file including the data in each cell within the local storage database 80. More specifically, the address ad001 to ad003 is information indicating a storage location within the local storage database 80 of a starting position of all of the data constituting the file that includes the data. Further, the offset of001 to of006 is information indicating an offset amount of the data in each cell from the address ad001 to ad003. The offset of001 to of006 is information provided when the data constituting each file are fragmented and stored in each cell of the cache area 51, and expresses the offset of the position of the data within the file from the starting position of the file expressed by the address ad001 to ad003. By including information indicating the offset of001 to of006, the cache management unit 23 can manage the data in each cell in association with the address of the file including the data even when all or a part of the data constituting a single file are fragmented and stored separately in the cache area 51. Here, the offset of001 to of006 may be provided as information indicating the offset amount from the address ad001 to ad003 as a data length such as 64 [kbyte] or 256 [kbyte], for example.

Returning to FIG. 1, the cache storage unit 22 is a processing unit for performing processing to store the data read by the reading processing unit 21 in the cache area 51. In this embodiment, the cache storage unit 22 performs processing to store the data read from the local storage database 80 by the reading processing unit 21 in the cache area 51 anew. In other words, when data are read from the cache area 51 by the reading processing unit 21, the cache storage unit 22 does not perform processing to store these data in the cache area 51. As shown in FIG. 3, the cache storage unit 22 stores the data read by the reading processing unit 21 in each cell of the cache area 51 after dividing the data into unit data amounts corresponding to each cell. At this time, the cache storage unit 22 also performs processing to delete old data in a data amount corresponding to the data amount of the newly stored data from the cache area 51. Here, the cache storage unit 22 performs processing to delete the oldest data of the data stored in the cache area 51, in order of storage. To realize this constitution, the cache area 51 preferably has a FIFO (First-In First-Out) memory structure, for example. Alternatively, data indicating the storage time may be attached to the data in each cell of the cache area 51 such that the data with the oldest storage time should be deleted in order. In this embodiment, the cache storage unit 22 corresponds to a cache storage unit according to the present invention.

Furthermore, in this embodiment, the cache storage unit 22 performs cache data assurance processing to avoid a content mismatch between the update map data 81 stored in the local storage database 80 following an update and the data stored in the cache area 51 corresponding to a file of the updated update map data 81, which occurs as a result of the update processing performed on the update map data 81 by the difference synthesis unit 41 of the update processing unit 40. In this cache data assurance processing, when a file constituting the update map data 81 updated by the difference synthesis unit 41 is detected to have been written to the local storage database 80 and data having the same address as the written file (i.e. the same file) exist in the cache area 51, the data are deleted from the cache area 51. By performing this cache data assurance processing, a situation in which the reading processing unit 21 intends to read the data in the file constituting the updated update map data 81 but mistakenly reads the data in a file corresponding to the old, pre-update update map data 81 from the cache area 51 can be avoided.

As described above, by having the reading processing unit 21 use the cache area 51 of the memory 50 as a cache, data that are read a plurality of times can be read from the cache area 51 rather than the local storage database 80. Hence, reading processing can be performed faster than in a case where all of the data are read directly from the local storage database 80. In this embodiment, situations in which the same data are read a plurality of times occur particularly frequently when the updated update map data 81 are converted to the reference map data 71 by the reference data conversion unit 42. An example of a reason for this is as follows. The reference data conversion unit 42 converts a plurality of types of map data, such as common map data, display/map matching map data, and route search map data into the reference map data 71 on the basis of a single piece of update map data 81, and therefore the content of the same update map data 81 is read a plurality of times. Further, the reference map data 71 in each section P include information relating to the adjacent section P to facilitate display, search, guidance, and so on near the boundary between the sections P, and therefore the content of the same update map data 81 is read a plurality of times to obtain the information relating to the adjacent section P. Hence, in the navigation device 1 according to this embodiment, an increase in processing speed can be achieved using the cache area 51 particularly when reading the data in a file specified by the reference data conversion unit 42.

(Memory Management Unit)

Returning to FIG. 1, the memory management unit 30 is used when the update processing unit 40 executes update processing and the navigation processing unit 60 executes the respective application processes, and also manages the memory 50 that is used as a cache during the data reading processing of the file reading unit 20. In this embodiment, the memory management unit 30 includes a processing memory capacity determination unit 31, a navigation memory capacity determination unit 32, a cache capacity determination unit 33, and a memory area determination unit 34. Here, the processing memory capacity determination unit 31 corresponds to a processing memory capacity determination unit according to the present invention, the navigation memory capacity determination unit 32 corresponds to a navigation memory capacity determination unit according to the present invention, and the cache capacity determination unit 33 corresponds to a cache capacity determination unit according to the present invention.

FIGS. 4A, 4B, 5A and 5B are views showing a specific example of area setting in the interior of the memory 50 serving as the management subject of the memory management unit 30. As shown in the drawings, the cache area 51, which is used as a cache during the data reading processing of the file reading unit 20, an update processing area 52 used during the update processing of the update processing unit 40, and a navigation processing area 53 used during the navigation processing of the navigation processing unit 60 are set in the memory 50. In the example shown in the drawings, all or a part of a display processing area 54, a map matching processing area 55, a route search processing area 56, and a route guidance processing area 57 may be set as the navigation processing area 53.

The processing memory capacity determination unit 31 is a processing unit for performing processing to determine a processing memory capacity, i.e. a memory capacity required as the update processing area 52, on the basis of the content of the update map data 81 serving as the update processing subject of the update processing unit 40. In this embodiment, the processing memory capacity determination unit 31 determines the processing memory capacity on the basis of the number of roads and the number of intersections included in the update map data 81 in the update subject section serving as the update processing subject. As described above, the update map data 81 stored in the local storage database 80 includes road network data constituted by a plurality of nodes N corresponding respectively to a plurality of intersections existing within the subject section P of the update map data 81 and a plurality of links L corresponding to roads connecting the nodes N (see FIG. 2). Therefore, the processing memory capacity determination unit 31 uses the number of links, i.e. the number of links L included in the update map data 81, to represent the number of roads in the update subject section, and uses the number of nodes, i.e. the number of nodes N included in the update map data 81, to represent the number of intersections in the update subject section. In other words, the processing memory capacity determination unit 31 according to this embodiment determines the processing memory capacity on the basis of the number of links and the number of nodes included in the update map data 81 in the update subject section.

More specifically, the processing memory capacity determination unit 31 determines the processing memory capacity in accordance with a following Equation (1).

$$(\text{Processing memory capacity}) = (\text{number of links}) \times D1 + (\text{number of nodes}) \times D2 + C \qquad (1)$$

In this equation, D1 is the memory capacity of the update processing area 52 required per link, and D2 is the memory capacity of the update processing area 52 required per node. Further, C is a fixed value representing the required memory capacity of the update processing area 52, regardless of the number of links and the number of nodes. Here, the values of D1, D2 and C may be determined through experiment on the basis of the processing memory capacity required during update processing of the update map data 81 with various link numbers and node numbers.

Hence, when the update map data 81 in a section P having a large number of links (number of roads) and a large number of nodes (number of intersections) and a high road density, for example the update map data 81 of a section P corresponding to a city, are subjected to update processing, the processing memory capacity determination unit 31 sets the processing memory capacity at a large value. In this case, as shown in FIG. 4A, the memory area determination unit 34 sets the update processing area 52 within the memory 50 to be comparatively large. On the other hand, when the update map data 81 in a section P having a small number of links (number of roads) and a small number of nodes (number of intersections) and a low road density, for example the update map data 81 of a section P corresponding to an area outside of a city, are subjected to update processing, the processing memory capacity determination unit 31 sets the processing memory capacity at a small value. In this case, as shown in FIG. 4B, the memory area determination unit 34 sets the update processing area 52 within the memory 50 to be comparatively small.

Further, when update processing on the update map data 81 of one update subject section is complete and the update processing subject shifts to the update map data 81 in the next update subject section, the processing memory capacity determination unit 31 determines the processing memory capacity anew on the basis of the number of links (number of roads) and the number of nodes (number of intersections) in the update map data 81 of the next update subject section. Thus, the processing memory capacity can be determined appropriately in accordance with the content of the update map data 81 in the update subject section at each point in time. Accordingly, the update processing area 52 can be set variably within the memory 50 at an appropriate size by the memory area determination unit 34 in accordance with the content of the update map data 81 in the update subject section at each point in time.

The navigation memory capacity determination unit 32 is a processing unit for performing processing to determine a navigation memory capacity, i.e. the capacity of the memory 50 required as the navigation processing area 53, on the basis of the content of the processing executed by the navigation processing unit 60 as the navigation processing. In this embodiment, the navigation memory capacity determination unit 32 determines the navigation memory capacity on the basis of the type of the application processing that is underway as the navigation processing. As described above, the navigation processing unit 60 includes the display processing unit 61, the map matching processing unit 62, the route search processing unit 63, and the route guidance processing unit 64, and the display processing, map matching processing, route search processing, and route guidance processing executed respectively by the application processing units 61 to 64 serve as application processes. Hence, the navigation memory capacity determination unit 32 determines the capacity of the memory 50 required to execute the application processing in relation to each of the application processes. More specifically, the navigation memory capacity determination unit 32 respectively determines a display processing memory capacity required for the display processing, a map matching processing memory capacity required for the map matching processing, a route search processing memory capacity required for the route search processing, and a route guidance processing memory capacity required for the route guidance processing. The navigation memory capacity determination unit 32 then obtains information relating to the execution state of each application process, and determines the navigation memory capacity on the basis of the total memory capacity required for the application processes that are underway.

Specifically, the navigation memory capacity determination unit 32 sets the display processing memory capacity, map matching processing memory capacity, route search processing memory capacity, and route guidance processing memory capacity in advance as fixed values. The navigation memory capacity determination unit 32 then determines a total memory capacity, which is obtained by adding together the memory capacity relating to all of the application processes that are underway, as the navigation memory capacity. In other words, the memory capacity relating to the application processes that are not underway is not added to the navigation memory capacity. Here, the values of the display processing memory capacity, map matching processing memory capacity, route search processing memory capacity, and route guidance processing memory capacity, which are set in advance as fixed values, may all be determined through experiment on the basis of a typical operating state of each application process.

Hence, when the number of application processes that are underway is large and the memory capacity required for the application processes that are underway is large, the navigation memory capacity determination unit 32 sets the navigation memory capacity at a large value. In this case, as shown in FIG. 5A, for example, the memory area determination unit 34 sets the navigation processing area 53 of the memory 50 to be comparatively large. On the other hand, when the number of application processes that are underway is small and the memory capacity required for the application processes that are underway is small, the navigation memory capacity determination unit 32 sets the navigation memory capacity at a small value. In this case, as shown in FIG. 5B, for example, the memory area determination unit 34 sets the navigation processing area 53 of the memory 50 to be comparatively small. Here, FIG. 5A shows an example of area setting in the memory 50 in a case where all of the application processes, i.e. the display processing, map matching processing, route search processing, and route guidance processing, are underway. In this example, the display processing area 54, map matching processing area 55, route search processing area 56, and route guidance processing area 57 are all set as the navigation processing area 53, and therefore the navigation processing area 53 is set at a maximum capacity. On the other hand, FIG. 5B shows an example of area setting in the memory 50 in a case where only a part of the application processes, specifically the display processing and the map matching processing, is underway. In this example, only the display processing area 54 and the map matching processing area 55 are set as the navigation processing area 53, and therefore the navigation processing area 53 is set to be comparatively small. Note that FIG. 5A corresponds to a state in which a guidance route is set, while FIG. 5B corresponds to a state in which a guidance route is not set and only the vehicle position is displayed on the map.

Further, when execution of each application process is started or completed, the navigation memory capacity determination unit 32 determines the navigation memory capacity anew. More specifically, when execution of one of the application processes starts anew or execution of an application process that is underway is completed, the navigation memory capacity determination unit 32 determines a new navigation memory capacity taking into consideration the start or completion of the corresponding application process. Thus, the navigation memory capacity can be determined appropriately in accordance with the execution state of the respective application processes at each point in time. Therefore, the navigation processing area 53 can be set variably within the memory 50 at an appropriate size by the memory area determination unit 34 in accordance with the execution state of the respective application processes at each point in time.

The cache capacity determination unit 33 is a processing unit for performing processing to determine the cache capacity, i.e. the capacity of the memory 50 allocated to the cache area 51, on the basis of the processing memory capacity determined by the processing memory capacity determination unit 31 and the navigation memory capacity determined by the navigation memory capacity determination unit 32. In this embodiment, the cache capacity determination unit 33 sets a surplus memory capacity determined on the basis of a capacity obtained by subtracting the processing memory capacity and the navigation memory capacity from the total capacity of the memory 50 as the cache capacity. Accordingly, the cache capacity determination unit 33 sets the cache capacity to be steadily smaller as the sum total of the processing memory capacity and navigation memory capacity increases, and to be steadily larger as the sum total of the processing memory capacity and navigation memory capacity decreases.

The memory area determination unit 34 then determines the cache area 51 of the memory 50 in accordance with the cache capacity, i.e. the surplus memory capacity following setting of the update processing area 52 corresponding to the processing memory capacity and the navigation processing area 53 corresponding to the navigation memory capacity. Accordingly, the memory area determination unit 34 sets the cache area 51 to be steadily smaller as the sum total of the update processing area 52 and navigation processing area 53 increases, and to be steadily larger as the sum total of the update processing area 52 and navigation processing area 53 decreases. Incidentally, when the size of the cache area 51 is not set to be variable, in contrast to this embodiment, the update processing area 52 must be set on the basis of the maximum memory capacity required for the update processing of the update processing unit 40, and the navigation processing area 53 must be set on the basis of the maximum memory capacity required for the navigation processing of the navigation processing unit 60. In this case, the memory capacity of the cache area 51 is fixed at a minimum capacity, making it difficult to achieve an increase in the speed of the update processing. According to the constitution of this embodiment, however, the memory capacity of the cache area 51 can be secured appropriately at a maximum limit after securing the memory capacity required for the update processing and the memory capacity required for executing the navigation processing, and therefore an increase in the speed of the update processing can be achieved.

(Map Update Processing)

Figure 6:
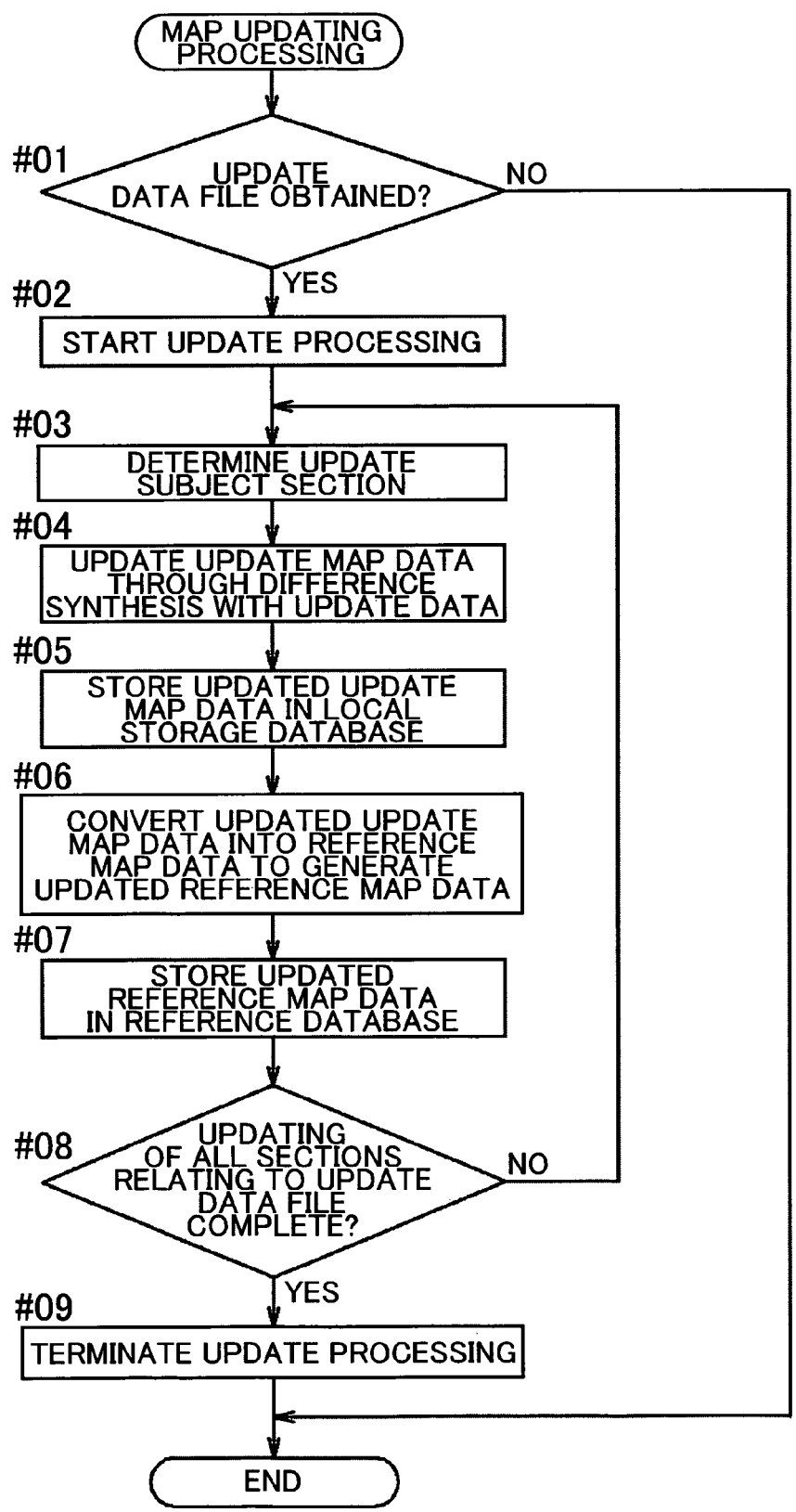
FIG. 6 is a flowchart showing a procedure of map update processing.

Next, a procedure of the map update processing executed by the update processing unit 40 will be described on the basis of the flowchart shown in FIG. 6. Having obtained the update data file 4 (step #01: Yes), the update processing unit 40 starts the update processing (step #02). When the update processing begins, an update processing flag switches ON, whereby it becomes possible to recognize that other processing units, such as the memory management unit 30, have also started update processing. Next, the difference synthesis unit 41 determines the update subject section (step #03). The update subject section is determined by selecting one section P from the one or more sections P in which the update data included in the update data file 4 are to be updated. Next, the difference synthesis unit 41 updates the update map data 81 in the update subject section by synthesizing differences with the update data included in the obtained update data file 4 (step #04). At this time, the difference synthesis unit 41 informs the file reading unit 20 of the address of the file that constitutes the update subject update map data 81 after reading the file. Accordingly, the file reading unit 20 executes file reading processing to be described below to read the data having the specified address from the cache area 51 of the memory 50 or the local storage database 80. The difference synthesis unit 41 then stores the updated update map data 81 in the local storage database 80 (step #05). Thus, the local storage database 80 is updated.

Next, the reference data conversion unit 42 reads the updated update map data 81 from the local storage database 80 and converts the read update map data 81 into the reference map data 71 to generate the updated reference map data 71 (step #06). At this time, the reference data conversion unit 42 informs the file reading unit 20 of the address of the file that constitutes the updated update map data 81 subjected to conversion processing after reading the file. Accordingly, the file reading unit 20 executes the file reading processing to be described below to read the data having the specified address from the cache area 51 of the memory 50 or the local storage database 80. The reference data conversion unit 42 then stores the updated reference map data 71 in the reference database 70. Thus, the reference database 70 is updated. Next, the update processing unit 40 determines whether or not the update processing has been completed on all of the sections P relating to the obtained update data file 4 (step #08). When the update processing has not been completed on all of the sections P (step #08: No), the processing returns to the step #03, in which the difference synthesis unit 41 determines the next new update subject section. The update map data 81 and reference map data 71 relating to the new update subject section are then updated using similar processing to that described above (step #04 to step #07). When the update processing has been completed on all of the sections P relating to the obtained update data file 4, on the other hand (step #08: Yes), the update processing unit 40 terminates the update processing (step #09). When the update processing is terminated, the update processing flag is switched OFF, making it possible to recognize that the other processing units, such as the memory management unit 30, have also terminated update processing. The map update processing procedure is then terminated.

(File Reading Processing)

Figure 7:
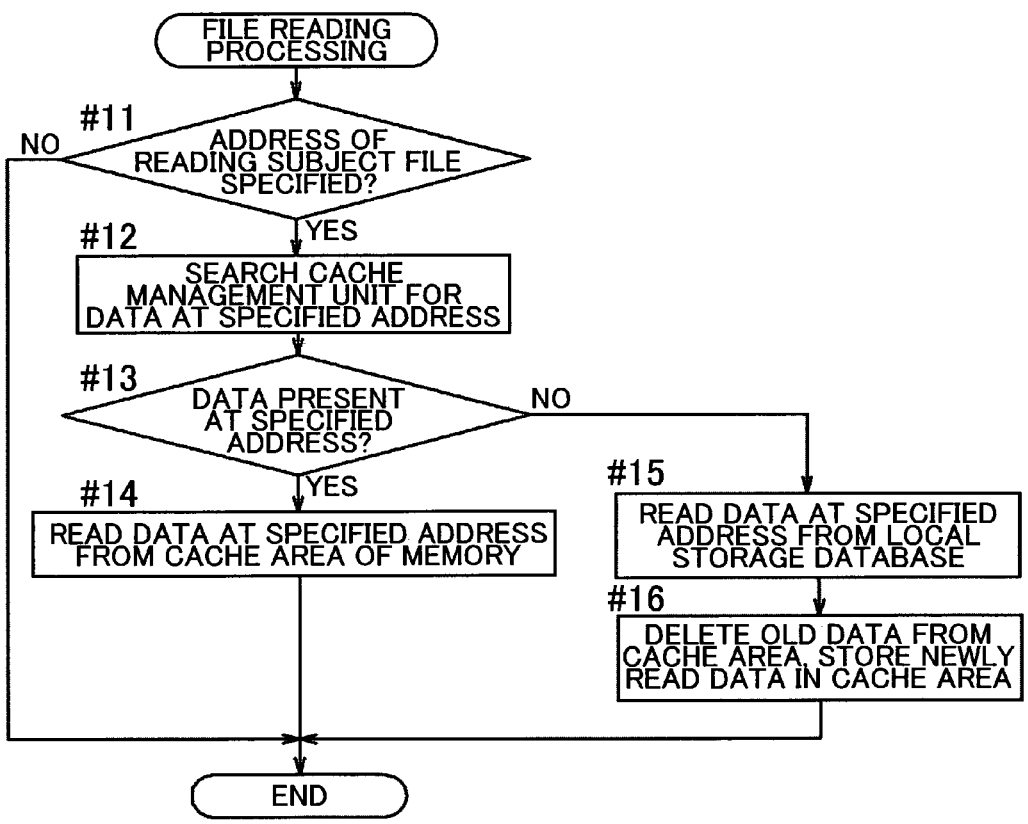
FIG. 7 is a flowchart showing a procedure of file reading processing.

Next, a procedure of the file reading processing executed by the file reading unit 20 will be described on the basis of the flowchart shown in FIG. 7. Having been informed of the address of the reading subject file by the update processing unit 40 (step #11: Yes), the reading processing unit 21 first searches the cache management unit 23 for the data at the specified address (step #12). The cache management unit 23 stores management information for managing the data stored in the cache area 51 of the memory 50 in association with the address in the local storage database 80 of the file including the data. Hence, when the data at the specified address are found in the cache management unit 23, it can be determined that at least a part of the data in the specified file is stored in the cache area 51. Accordingly, when the data of the specified address are found in the cache management unit 23 (step #13: Yes), the reading processing unit 21 reads the data at the specified address from the cache area 51 of the memory 50 (step #14).

When there are no data at the specified address in the cache management unit 23, on the other hand (step #13: No), the reading processing unit 21 reads the data at the specified address from the local storage database 80 (step #15). The cache storage unit 22 then deletes the old data from the cache area 51 and stores the data newly read in the step #15 in the cache area 51 (step #16). At this time, the cache storage unit 22 deletes old data in a data amount corresponding to the data amount of the newly stored data in sequence from the data having the oldest storage time. The file reading processing procedure is then terminated.

(Cache Data Assurance Processing)

Figure 8:
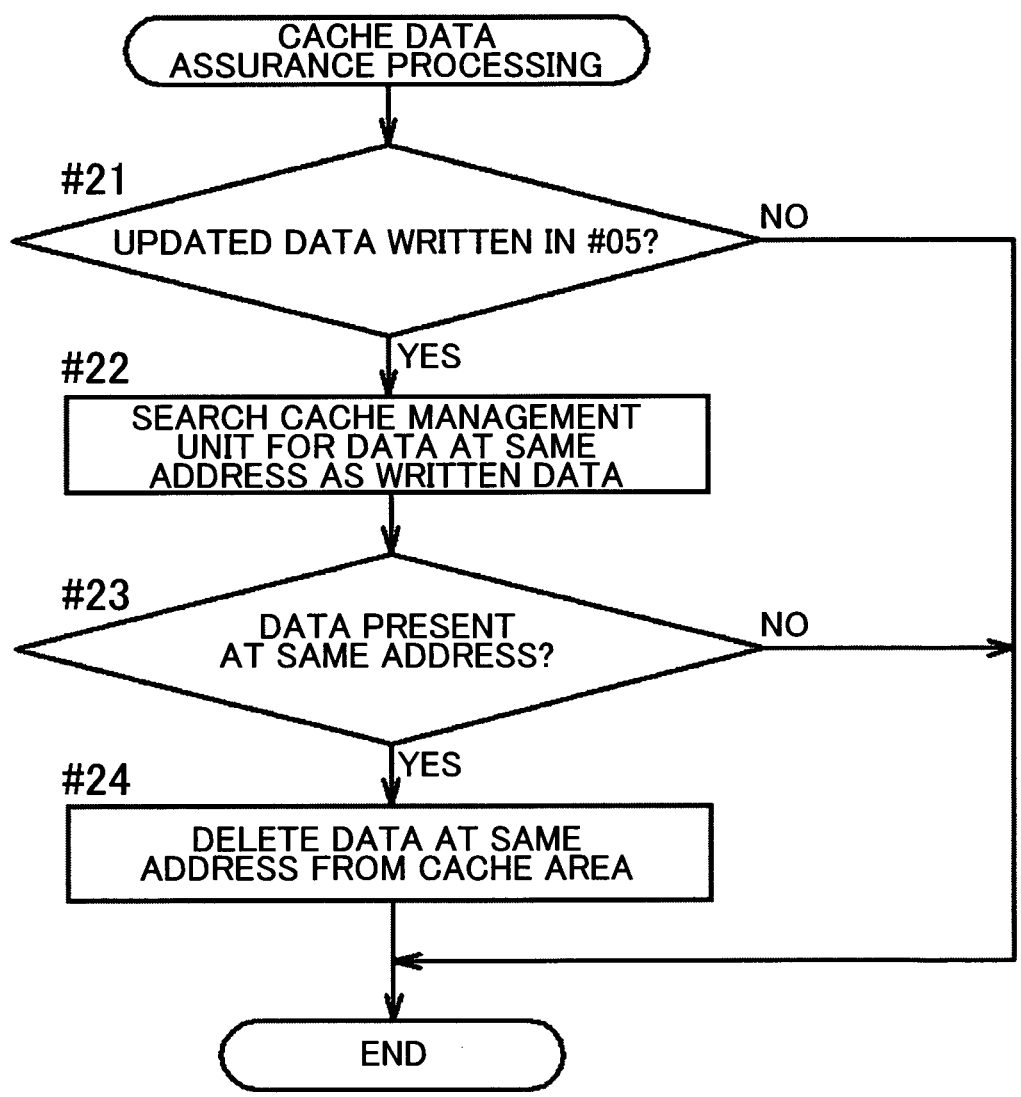
FIG. 8 is a flowchart showing a procedure of cache data assurance processing.

Next, a procedure of the cache data assurance processing executed by the cache storage unit 22 will be described on the basis of the flowchart shown in FIG. 8. The cache storage unit 22 determines whether or not the update map data 81 updated by the difference synthesis unit 41 in the step #05 of FIG. 6 has been written to the local storage database 80 (step #21). When the updated data have been written (step #21: Yes), the cache storage unit 22 searches the cache management unit 23 for data having the same address as the file constituting the written data (step #22). When data having the same address as the file constituting the updated update map data 81 written to the local storage database 80 are found in the cache management unit 23, it can be determined that old, pre-update data corresponding to the updated data are stored in the cache area 51. Hence, when data having the same address are found in the cache management unit 23 (step #23: Yes), the cache storage unit 22 deletes the corresponding data having the same address in the cache area 51 from the cache area 51 (step #24). Thus, a mismatch between the updated update map data 81 stored in the local storage database 80 as a result of the update processing performed on the update map data 81 and the data stored in the cache area 51 can be avoided.

(Memory Management Processing)

Figure 9:
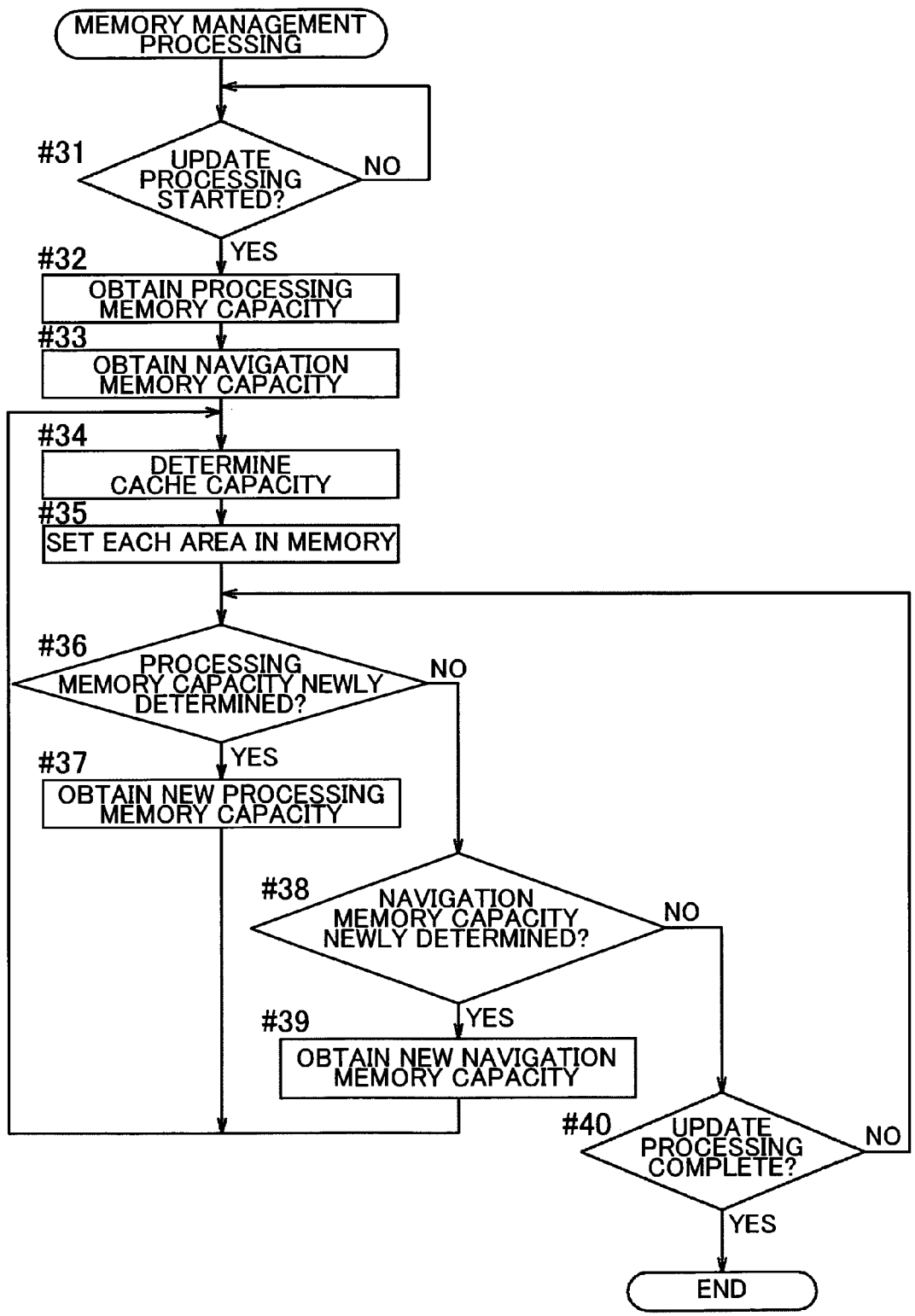
FIG. 9 is a flowchart showing a procedure of memory management processing.

Next, a procedure of the memory management processing executed by the memory management unit 30 will be described on the basis of the flowchart shown in FIG. 9. First, the memory management unit 30 determines whether or not the update processing has begun (step #31). This determination is made on the basis of whether or not the update processing flag has been switched ON in the step #02 of FIG. 6, described above. When the update processing has begun (step #31: Yes), the cache capacity determination unit 33 obtains the processing memory capacity determined by the processing memory capacity determination unit 31 (step #32). The processing memory capacity determination processing performed by the processing memory capacity determination unit 31 will be described in detail below on the basis of the flowchart shown in FIG. 10. Further, the cache capacity determination unit 33 obtains the navigation memory capacity determined by the navigation memory capacity determination unit 32 (step #33). The navigation memory capacity determination processing performed by the navigation memory capacity determination unit 32 will be described in detail below on the basis of the flowchart shown in FIG. 11. Next, the cache capacity determination unit 33 determines the cache capacity on the basis of the processing memory capacity obtained in the step #32 and the navigation memory capacity obtained in the step #33 (step #34). As a result, the processing memory capacity, navigation memory capacity, and cache capacity are determined, and therefore the memory area determination unit 34 sets the update processing area 52, the navigation processing area 53; and the cache area 51 in the memory 50 in accordance with the processing memory capacity, the navigation memory capacity, and the cache capacity, respectively (step #35).

Figure 10:
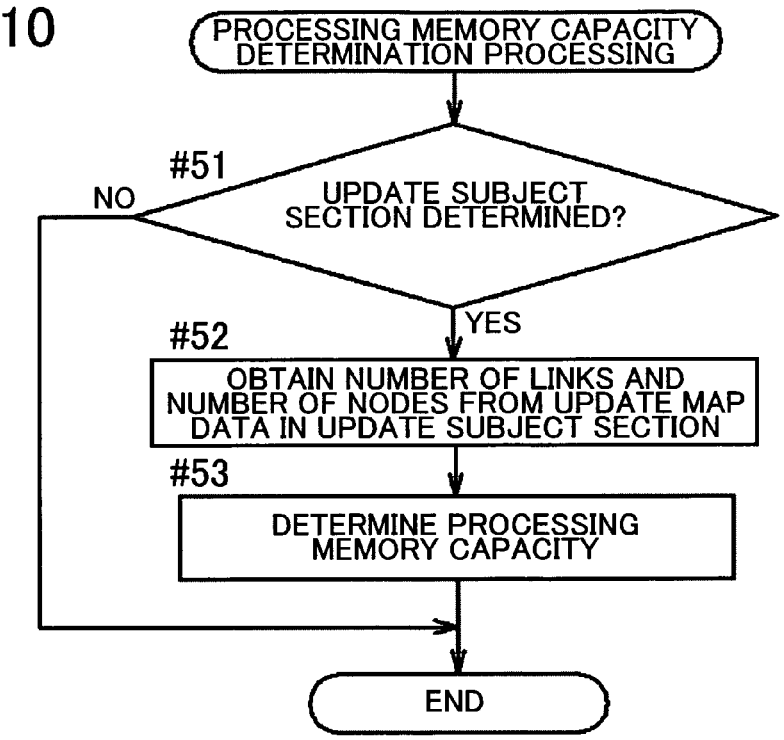
FIG. 10 is a flowchart showing a procedure of processing memory capacity determination processing.
Figure 11:
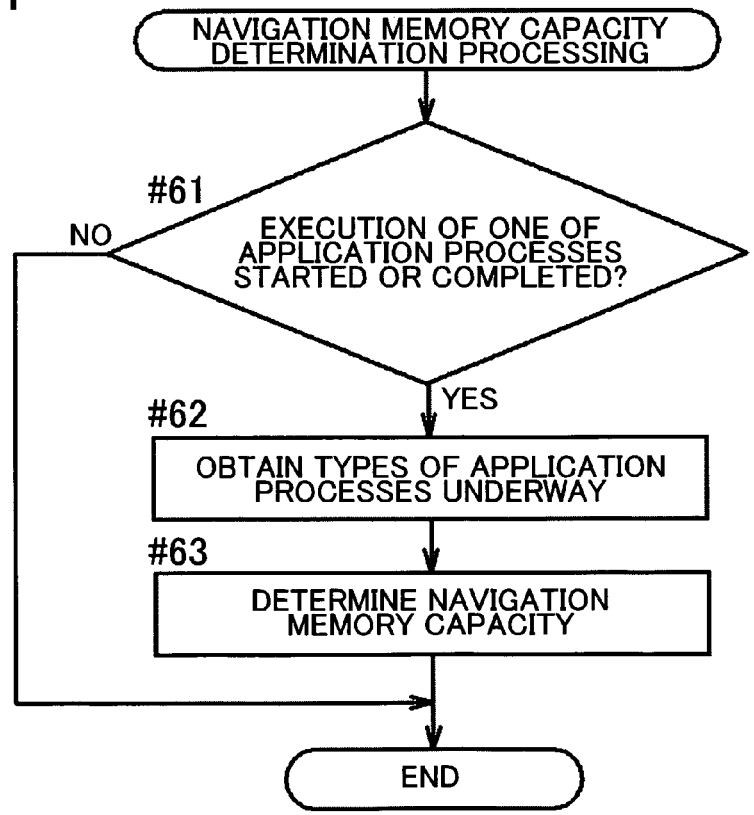
FIG. 11 is a flowchart showing a procedure of navigation memory capacity determination processing.

As will be described below with reference to the flowcharts shown in FIGS. 10 and 11, the processing memory capacity determination unit 31 determines a new processing memory capacity every time a new update subject section is determined, and the navigation memory capacity determination unit 32 determines a new navigation memory capacity every time execution of one of the application processes starts or ends. Therefore, when the processing memory capacity or the navigation memory capacity is modified in this manner, the cache capacity determination unit 33 determines the cache capacity anew in accordance with the modification. As a result, the cache capacity can be modified appropriately in accordance with the processing memory capacity and navigation memory capacity required at each point in time, and the maximum securable cache capacity can be set in the cache area 51 at each point in time.

Accordingly, the cache capacity determination unit 33 determines whether or not the processing memory capacity has been newly determined (step #36). When the processing memory capacity has been newly determined (step #36: Yes), the cache capacity determination unit 33 obtains the new processing memory capacity (step #37). The processing then returns to the step #34, in which the cache capacity determination unit 33 determines a new cache capacity on the basis of the new processing memory capacity. Further, when the processing memory capacity has not been newly determined (step #36: No), the cache capacity determination unit 33 determines whether or not the navigation memory capacity has been newly determined (step #38). When the navigation memory capacity has been newly determined (step #38: Yes), the cache capacity determination unit 33 obtains the new navigation memory capacity (step #39). The processing then returns to the step #34, in which the cache capacity determination unit 33 determines a new cache capacity on the basis of the new navigation memory capacity. Note that when the newly determined cache capacity differs from the previous cache capacity, the memory area determination unit 34 preferably performs processing to attach or remove the memory capacity of the cache area 51 to or from each predetermined unit memory capacity.

When neither the processing memory capacity nor the navigation memory capacity has been newly determined (step #38: No), the memory management unit 30 determines whether or not the update processing is complete (step #40). This determination is made on the basis of whether or not the update processing flag has been switched OFF in the step #09 of FIG. 6, described above. When the update processing is not complete (step #40: No), the processing returns to the step #36. When the update processing is complete (step #40: Yes), the memory management processing procedure is terminated.

(Processing Memory Capacity Determination Processing)

Next, a procedure of the processing memory capacity determination processing executed by the processing memory capacity determination unit 31 will be described on the basis of the flowchart shown in FIG. 10. First, the processing memory capacity determination unit 31 determines whether or not the update subject section has been determined (step #51). This determination is made on the basis of whether or not an update subject section has been determined in the step #03 of FIG. 6, described above. When the update subject section has been determined (step #51: Yes), the processing memory capacity determination unit 31 obtains the number of links and the number of nodes from the update map data 81 in the determined update subject section (step #52). The processing memory capacity determination unit 31 then determines the processing memory capacity on the basis of the number of links and the number of nodes obtained in the step #52 (step #53). Thus, the processing memory capacity determination unit 31 determines a processing memory capacity corresponding to the update map data 81 in the update subject section every time the update subject section is determined. Accordingly, the processing memory capacity can be set appropriately in accordance with the update map data 81 to be subjected to update processing at each point in time.

(Navigation Memory Capacity Determination Processing)

Next, a procedure of the navigation memory capacity determination processing executed by the navigation memory capacity determination unit 32 will be described on the basis of the flowchart shown in FIG. 11. First, the navigation memory capacity determination unit 32 determines whether or not execution of one of the application processes has started or ended (step #61). This determination is made by having the navigation memory capacity determination unit 32 monitor the execution state of the respective application processes performed by the display processing unit 61, map matching processing unit 62, route search processing unit 63, and route guidance processing unit 64 of the navigation processing unit 60. When execution of one of the application processes has started or ended (step #61: Yes), the navigation memory capacity determination unit 32 obtains the type of the application process that is currently underway (step #62). The navigation memory capacity determination unit 32 then determines the navigation memory capacity on the basis of the type of the application process that is underway, obtained in the step #62 (step #63). Thus, the navigation memory capacity determination unit 32 determines a navigation memory capacity corresponding to the type of the application process that is currently underway every time one of the application processes starts or ends. Accordingly, the navigation memory capacity can be set appropriately in accordance with the type of the application process that is underway at each point in time.

Other Embodiments (1) In the above embodiment, an example of a case in which the processing memory capacity determination unit 31 determines the processing memory capacity on the basis of both the number of roads (number of links) and the number of intersections (number of nodes) included in the update map data 81 to be subjected to update processing was described. However, the present invention is not limited to this embodiment. In another preferred embodiment of the present invention, the processing memory capacity determination unit 31 may determine the processing memory capacity on the basis of either one of the number of roads and the number of intersections included in the update map data 81 to be subjected to update processing, or either one of the number of links and the number of nodes. In this case, the processing memory capacity can be set in a similar manner to that of the embodiment described above by deleting the item relating to the number of links or the number of nodes from Equation (1) and setting the value of the coefficient D1 or D2 appropriately.

(2) In a further preferred embodiment of the present invention, the processing memory capacity determination unit 31 may determine the processing memory capacity on the basis of content of the update map data 81 other than the number of roads (number of links) and the number of intersections (number of nodes). Examples of this content of the update map data 81 include the data amount of the update map data 81 to be subjected to update processing (i.e. the update map data 81 in the update subject section). In this case, the processing memory capacity determination unit 31 preferably determines the processing memory capacity to be commensurate with the data amount of the update map data 81, for example.

(3) In the above embodiment, an example of a case in which the navigation memory capacity determination unit 32 determines the navigation memory capacity on the basis of the type of the application process that is underway was described. However, the present invention is not limited to this embodiment. In another preferred embodiment, the navigation memory capacity determination unit 32 may determine the navigation memory capacity on the basis of the number of application processes that are underway or both the types and number of the application processes that are underway. When the navigation memory capacity is determined on the basis of the number of application processes that are underway, the navigation memory capacity determination unit 32 may set a predetermined memory capacity as the navigation memory capacity in accordance with the number of application processes that are underway, for example.

(4) In a further preferred embodiment of the present invention, the navigation memory capacity determination unit 32 determines the navigation memory capacity on the basis of processing content executed as the navigation processing other than the types and number of the application processes that are underway. Examples of the processing content executed as the navigation processing include the data amount of the reference map data 71 that is read from the reference database 70 by all of the application processes that are underway and so on, for example. In this case, the navigation memory capacity determination unit 32 preferably determines the navigation memory capacity to be commensurate with the data amount of the read reference map data 71.

(5) In the above embodiment, an example of a case in which the navigation device 1 serving as the map updating system includes both the processing memory capacity determination unit 31 and the navigation memory capacity determination unit 32 and the cache capacity determination unit 33 determines the cache capacity on the basis of both the processing memory capacity and the navigation memory capacity determined thereby was described. However, the present invention is not limited to this embodiment. In another preferred embodiment of the present invention, when the memory used by the navigation processing unit 60 is provided independently of the memory 50 used for the update processing or the like, for example, the map updating system need not include the navigation memory capacity determination unit 32, and the cache capacity determination unit 33 may determine the cache capacity on the basis of the processing memory capacity determined by the processing memory capacity determination unit 31. In this case, the cache capacity determination unit 33 preferably sets a surplus memory capacity determined on the basis of a capacity obtained by subtracting the processing memory capacity from the total capacity of the memory 50 as the cache capacity.

(6) In a further preferred embodiment of the present invention, when the processing memory capacity required for the update processing area does not vary greatly according to the content of the map data to be subjected to update processing or the like, for example, the map updating system need not include the processing memory capacity determination unit 31, and the cache capacity determination unit 33 may determine the cache capacity on the basis of the navigation memory capacity determined by the navigation memory capacity determination unit 32. In this case, the cache capacity determination unit 33 preferably sets a surplus memory capacity determined on the basis of a capacity obtained by subtracting the navigation memory capacity from the total capacity of the memory 50 as the cache capacity. At this time, the surplus memory capacity is preferably determined by subtracting a processing memory capacity having a fixed value from the total capacity of the memory 50 also.

(7) In the above embodiment, an example of a case in which the update processing unit 40 subjects the update map data 81 and the reference map data 71 to update processing successively in units of the section P was described. However, the present invention is not limited to this embodiment, and a unit other than the section P may be used as the units of map data to be subjected to update processing. Hence, in another preferred embodiment of the present invention, update processing may be performed in another divisible unit of map data, for example a layer or a data type.

(8) In the above embodiment, an example of a case in which the cache storage unit 22 deletes previously stored data in order of age when storing new data in the cache area 51 was described. However, the present invention is not limited to this embodiment. In another preferred embodiment of the present invention, previously stored data that have been read recently may be excluded from deletion, or the data of which the latest reading time is oldest may be deleted in order, for example.

(9) In the above embodiment, an example of a case in which the navigation device 1 serving as the map updating system includes the local storage database 80 storing the update map data 81 that are updated by the update data and the reference database 70 storing the reference map data 71 that are referenced by the navigation processing unit 60 was described. However, the present invention is not limited to this embodiment. In another preferred embodiment of the present invention, the map updating system includes a single map database for storing map data, and the map data stored in the single map database are updated by the update data, for example.

(10) In the above embodiment, an example of a case in which the map updating system according to the present invention is applied to the navigation device 1 serving as a vehicle-installed terminal device was described. However, the present invention is not limited to this embodiment, and the map updating system according to the present invention may also be applied to a navigation device not installed in a vehicle or a different map database updating system to a navigation device.

INDUSTRIAL APPLICABILITY

The present invention may be used favorably in a map updating system that includes a map database storing map data and performs update processing on the map database upon reception of update data, and a map updating program for performing this type of map database update processing.

The invention claimed is:

1. A map updating system that includes a map database storing map data and performs update processing on the map database upon reception of update data, comprising:
    a memory having an update processing area and a cache area, wherein said update processing area is used for the update processing and said cache area is used as a cache;
    an update processing unit for performing the update processing by reading data required in the update processing from the cache area when the data are stored in the cache area, and from the map database when the data are not stored in the cache area;
    a processing memory capacity determination unit for determining an amount of processing memory required for processing, wherein the amount of processing memory required is a capacity of the memory required as the update processing area, based on at least one of a number of roads and a number of intersections included in the map data to be subjected to the update processing; and
    a cache capacity determination unit for determining a cache capacity, which is a capacity of the memory allocated to the cache area, based on the required capacity of the update processing area.

2. The map updating system according to claim 1, wherein the cache capacity determination unit sets a surplus memory capacity determined on the basis of a capacity obtained by subtracting the processing memory capacity from a total capacity of the memory as the cache capacity.

3. The map updating system according to claim 1, wherein the map data include road network data constituted by a plurality of nodes corresponding to intersections and a plurality of links corresponding to roads that connect the nodes, and
    the processing memory capacity determination unit determines the processing memory capacity on the basis of one or both of the number of links and the number of nodes included in the map data to be subjected to the update processing.

4. The map updating system according to claim 1, wherein the processing memory capacity determination unit determines the processing memory capacity on the basis of a data amount of the map data to be subjected to the update processing.

5. The map updating system according to claim 1, wherein the map database stores the map data in each of a plurality of sections obtained by dividing a subject geographical area into the plurality of sections, and
    the update processing unit sets the map data in each of the sections as the update processing subject.

6. The map updating system according to claim 5, wherein, when the update processing subject shifts to the map data in a subsequent section, the processing memory capacity determination unit determines the processing memory capacity anew on the basis of the content of the map data in the subsequent section.

7. The map updating system according to claim 1, further comprising:
    a navigation processing unit for performing predetermined navigation processing; and
    a navigation memory capacity determination unit for determining a navigation memory capacity, which is a capacity required as an area of the memory used in the navigation processing, on the basis of processing content executed as the navigation processing, wherein the cache capacity determination unit determines the cache capacity on the basis of the processing memory capacity and the navigation memory capacity.

8. The map updating system according to claim 7, wherein the cache capacity determination unit sets a surplus memory capacity determined on the basis of a capacity obtained by subtracting the processing memory capacity and the navigation memory capacity from the total capacity of the memory as the cache capacity.

9. The map updating system according to claim 7, wherein the navigation memory capacity determination unit determines the navigation memory capacity on the basis of one or both of a type and a number of application processes that are underway as the navigation processing.

10. The map updating system according to claim 9, wherein the navigation memory capacity determination unit determines the navigation memory capacity anew when execution of the respective application processes is started or completed.

11. The map updating system according to claim 1, further comprising a cache storage unit for storing the data read by the update processing unit in the cache area, wherein the cache storage unit deletes the oldest stored data in order of storage from the cache area when new data are stored in the cache area.

12. The map updating system according to claim 1, further comprising a cache management unit for managing the data stored in the cache area in association with an address of a file that is stored in the map database and includes the data.

13. The map updating system according to claim 1, wherein the map database includes an update database storing update map data that are updated by the update data, and a reference database storing reference map data that are referenced by an application process that uses the map data, and the update processing unit, after updating the update map data with the update data, generates updated reference map data by converting the updated update map data into the updated reference map data, and stores the updated reference map data in the reference database.

14. A map updating system that includes a map database storing map data and performs update processing on the map database upon reception of update data, comprising:

a navigation processing unit for performing predetermined navigation processing;

a memory having a navigation processing area and a cache area, wherein the navigation processing area is used in the navigation processing and the cache area is used as cache;

an update processing unit for performing the update processing by reading data required in the update processing from the cache area when the data are stored in the cache area and from the map database when the data are not stored in the cache area;

a navigation memory capacity determination unit for determining an amount of navigation memory required, wherein the amount of navigation memory is a capacity of the memory required as the navigation processing area, on the basis of processing content executed as the navigation processing; and a cache capacity determination unit for determining a cache capacity, which is a capacity of the memory allocated to the cache area, based on the required capacity of the navigation processing area.

15. A non-transitory computer readable medium containing a map updating program for performing update processing on a map database storing map data upon reception of update data, which when executed by a processor, causes the processor to carry out the map updating program to cause a computer to realize:

an update processing function for performing the update processing by reading data required in the update processing from a cache area of a memory when the data are stored in the cache area and from the map database when the data are not stored in the cache area;

a processing memory capacity determination function for determining an amount of a processing memory required, wherein the amount of processing memory required is a capacity of the memory required as an update processing area of the memory that is used in the update processing, based on content of the map data to be subjected to the update processing; and a cache capacity determination function for determining a cache capacity, which is a capacity of the memory allocated to the cache area, based on the required capacity of the update processing area.

16. A non-transitory computer readable medium containing a map updating program for performing update processing on a map database storing map data upon reception of update data, which when executed by a processor, causes the processor to carry out the map updating program to cause a computer to realize:

a navigation processing function for performing predetermined navigation processing;

an update processing function for performing the update processing by reading data required in the update processing from a cache area of a memory when the data are stored in the cache area and from the map database when the data are not stored in the cache area;

a navigation memory capacity determination function for determining an amount of navigation memory required, wherein the amount of navigation memory required is a capacity of the memory required as a navigation processing area of the memory that is used in the navigation processing, based on processing content executed as the navigation processing; and a cache capacity determination function for determining a cache capacity, which is a capacity of the memory allocated to the cache area, of based on the required capacity of the navigation processing area.

* * * * *